(12) United States Patent
Siraky et al.

(10) Patent No.: US 7,222,550 B2
(45) Date of Patent: May 29, 2007

(54) ADJUSTING DEVICE WITH AUTOMATIC RELEASE MECHANISM

(75) Inventors: Josef Siraky, Donaueschingen (DE); Josef Maier, Blumberg (DE); Wilfried Roming, Schramberg (DE)

(73) Assignee: SICK | Stegmann GmbH, Donaueschingne (DE)

( * ) Notice: Subject to any disclaimer, the term of this patent is extended or adjusted under 35 U.S.C. 154(b) by 393 days.

(21) Appl. No.: 10/839,983

(22) Filed: May 5, 2004

(65) Prior Publication Data

US 2005/0000308 A1 Jan. 6, 2005

(30) Foreign Application Priority Data

May 7, 2003 (DE) ................. 103 20 271

(51) Int. Cl.
*F16H 21/00* (2006.01)

(52) U.S. Cl. .................. 74/27; 74/29; 74/31; 74/89.14

(58) Field of Classification Search .................. 74/27, 74/29, 31, 89, 89.14; 188/165, 166, 82.7, 188/82.74, 82.77; 192/223, 144
See application file for complete search history.

(56) References Cited

U.S. PATENT DOCUMENTS

| 1,283,142 | A | * | 10/1918 | Fraser | 74/27 |
| 2,125,543 | A | * | 8/1938 | Chandler | 192/223.3 |
| 3,593,593 | A | * | 7/1971 | Bradshaw | 74/498 |
| 4,202,430 | A | * | 5/1980 | Stevens | 188/171 |
| 4,282,776 | A | * | 8/1981 | Eller | 475/149 |
| 5,761,962 | A | * | 6/1998 | Aiso et al. | 74/424.6 |
| 6,053,287 | A | * | 4/2000 | Weinberger et al. | 187/370 |
| 6,216,394 | B1 | * | 4/2001 | Fenelon | 49/349 |
| 6,352,006 | B1 | * | 3/2002 | Kurashita | 74/409 |
| 6,390,230 | B1 | * | 5/2002 | Shimizu et al. | 180/444 |

FOREIGN PATENT DOCUMENTS

| DE | 197 44 695 A1 | 11/1998 |
| DE | 299 11 554 U1 | 9/1999 |
| DE | 198 47 016 A1 | 4/2000 |
| EP | 213292 A1 * | 3/1987 |
| GB | 2 142 410 A | 1/1985 |
| GB | 2 183 781 A | 6/1987 |

* cited by examiner

*Primary Examiner*—Richard Ridley
*Assistant Examiner*—Terence Boes
(74) *Attorney, Agent, or Firm*—Townsend and Townsend and Crew LLP

(57) ABSTRACT

An adjusting device has a carriage, at least one guide element, on which the carriage is mounted such that it can be moved, a shifting device for moving the carriage, and a securing mechanism for securing the carriage in a desired position. To provide an improved adjusting device, which has more compact construction and enables a simpler and more precise adjustment without additional contrivances, the shifting device has an electric motor, which is integrated in the carriage, and the securing mechanism blocks any movement of the carriage when the motor stands still and is automatically released when the motor starts running.

14 Claims, 6 Drawing Sheets

ADJUSTING DEVICE WITH AUTOMATIC RELEASE MECHANISM

BACKGROUND OF THE INVENTION

The invention concerns an adjusting device which has a carriage, at least one guide element on which the carriage is movably mounted, a shifting device for moving the carriage, and a securing mechanism for securing the carriage in a desired position.

Such adjusting devices are used in the machine building industry, for example for packaging machines, for converting of the machines from one packaging size to another. In this process, end stops and/or other machine parts, for example, are moved with the adjusting device and repositioned for the new assignment.

In such known devices, adjustments are made by hand with a tool, or in a motorized manner. In addition, a securing mechanism or lock is provided to secure the repositioned carriage of the adjusting device in its new location. The lock normally is a securing screw or the like. In order to simplify making adjustments, the adjusting devices include counters, for example for counting the revolutions of a spindle of the device.

SUMMARY OF THE INVENTION

Given this state of the art, the invention seeks to provide an improved adjusting device, which is of compact construction and allows more simple and precise adjustments without additional efforts or manual tasks.

This is attained with an adjusting device on which the shifting device includes an electric motor that is integrated into the carriage. The securing mechanism has a securing member adapted to block movements of the carriage when the motor is standing still and to automatically release the carriage and permit it to move when the motor is activated.

An adjusting device made according to the invention has a carriage, with at least one guide element on which the carriage is mounted and can move, a shifting member for displacing the carriage, and a securing mechanism for securing the carriage after it has been moved into a desired position. An electrical drive is provided for the shifting member which is integrated in the carriage. The securing mechanism prevents a displacement of the carriage when the motor is off and automatically releases the carriage when the motor is started.

A principal advantage is that no separate securing mechanism is necessary or needs to be activated because the adjusting device of the present invention becomes automatically blocked when the motor is off and is automatically released upon start-up of the motor. In this way, machine manipulations and time needed for converting the machine can be saved.

A further advantage is derived from the integration of the motor into the carriage, which saves considerable space and is of great benefit for today's compact machines. The invented configuration of the securing mechanism contributes substantially to the desired space savings.

Furthermore, due to the integration of the motor in the carriage, an otherwise necessary spindle or similar adjustment part can be omitted.

When the securing mechanism has a securing means and the securing means is the worm gear of a transmission drive, the self-locking property of worm gear drives can be used. Furthermore, worm gears have little play and generate little noise.

When the guide element, such as a guide rod, has a row of teeth, which mesh with the worm gear to move the carriage, the guide rod can be used both for guiding and for advancing the carriage.

In order to lock the securing mechanism in addition to the self-locking from the worm gear, a further modification of the invention provides that the securing means include a tensioning element for mounting the worm gear and clamping it against the row of teeth.

To disengage the securing mechanism, the clamping force exerted by the worm gear is automatically released against the force of the tensioning element when the motor is activated to thereby release the lock of the carriage in a simple manner.

In a simple embodiment of the invention, the clamping means is a leaf spring, which acts on one shaft of the worm gear and presses the worm gear against the row of teeth.

When the release means is a guide lever connected to the housing of the motor, which guides the position of the worm gear in dependence of the angular position of the motor housing, the rotary motion of the motor can be utilized to release the securing mechanism. A rotary motion always results because the motor must generate a certain torque.

Advantageously, the guide lever has a symmetrical configuration so that the securing mechanism can be released both when the motor runs clockwise or counterclockwise.

When the shifting device has a motor with a rotary decoder, preferably a multi-turn rotary decoder, the precise position of the carriage can be determined and output as position signals. The signals can be transmitted to a control system which uses them for making automatic adjustments without any no manual intervention.

For this, the angular position and/or revolutions of at least one driven transmission element, preferably the worm gear, is monitored with the rotary decoder.

The position signals are sent to the control system, which can automatically perform an adjustment via an interface. The position data can be programmable in the control system, for example, or it can be entered via storage media. An entire machine, e.g. a packaging machine, can be adjusted in only a few minutes, whereas one-half to one hour was needed for this task in the past.

To enhance stability, two guide rods are used as guide elements. The motor is arranged at the center of the carriage and drives, via a transmission, two worm gears, each of which engages a row of teeth of the guide rods for moving the carriage.

In this embodiment, the securing force can be increased by providing a securing mechanism and release for each worm gear.

To allow adjustments even when the control system malfunctions, the adjusting device includes manually operated activators for switching of the motor, e.g. start and stop elements for both clockwise and counterclockwise operations.

To enable an adjustment even under total current outage, a tool connection, for a hexagonal socket wrench for example, is provided so that the shifting device can be manually operated.

DESCRIPTION OF THE PREFERRED EMBODIMENTS

Figure 1:
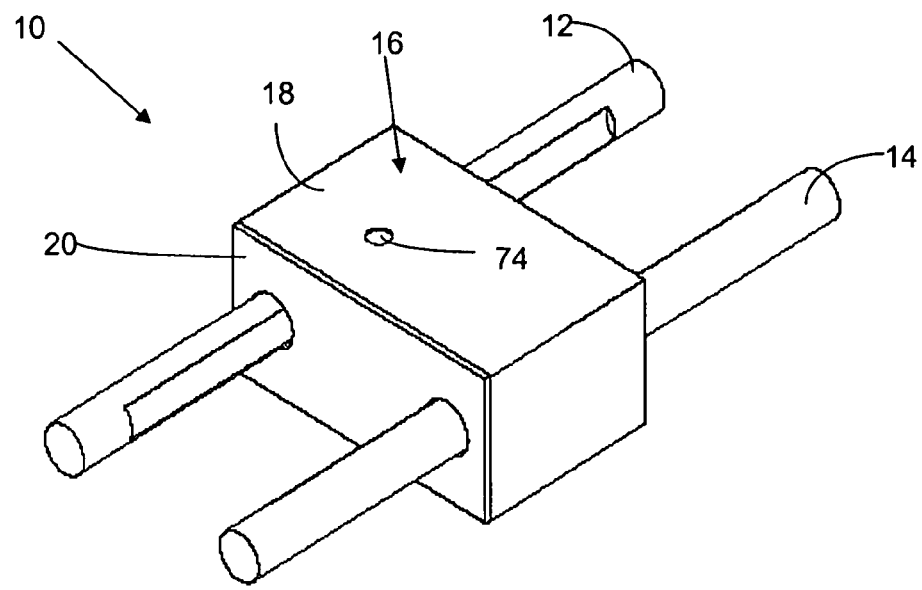
FIG. 1 shows an adjusting device made according to the invention.
Figure 2:
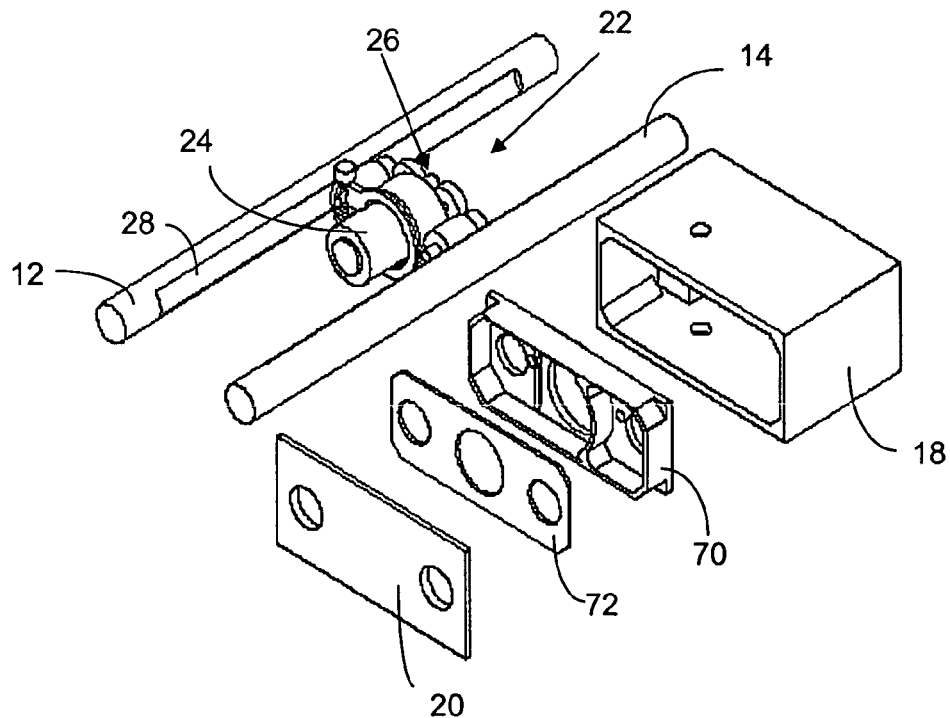
FIG. 2 shows the adjusting device of FIG. 1 with housing components shown separately.
Figure 3:
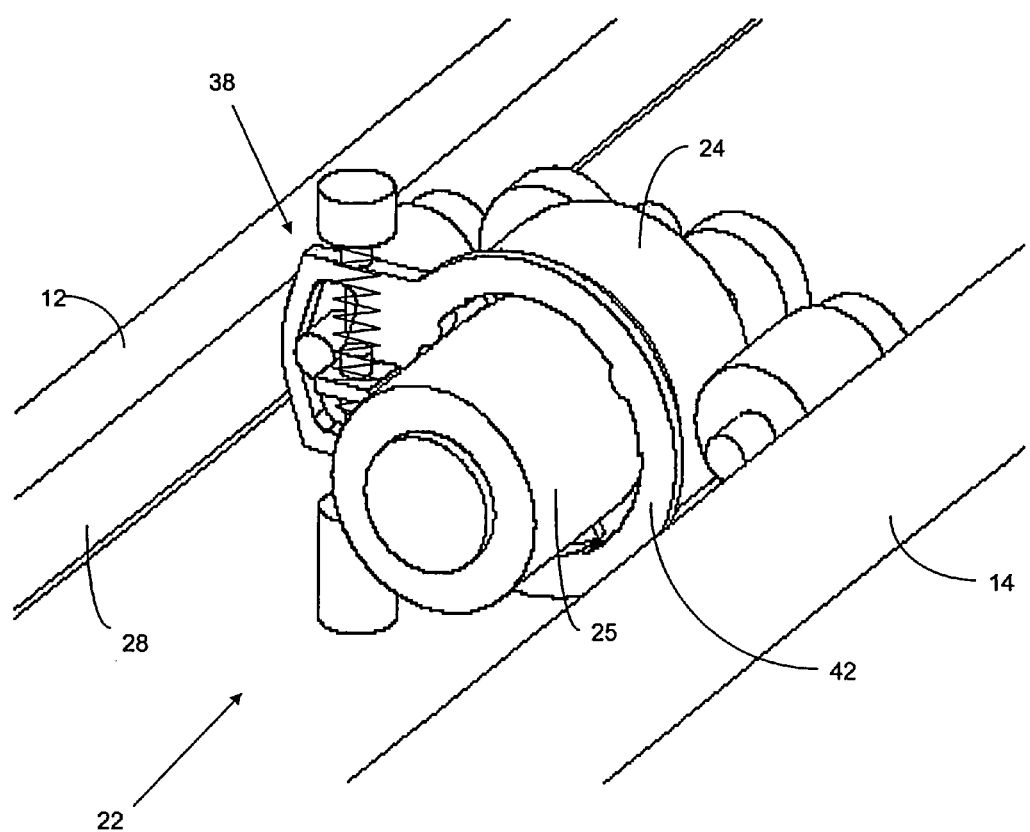
FIG. 3 shows a shifting device for the adjusting device of FIG. 1.

An adjusting device 10 shown in the drawing has a carriage 16 mounted so that it can move along two guide elements, e.g. guide rods 12 and 14. The carriage has a housing 18 with housing cover 20 through which guide rods 12 and 14 extend.

In the housing is a shifting device 22 with which the carriage 16 can be moved along guide rods 12 and 14. The shifting device 22 has an electric motor 24 and a transmission 26 for propulsion. The transmission 26 is symmetrically configured and has first and second parts that engage the rows of teeth 28 and 30 on either side in respective guide rods 12 and 14. Each part of the transmission 26 consists of a first gear 32.1 and 32.2, which are driven by a drive pinion 34. The first gear 32.1 or 32.2 drives a worm gear 36.1 or 36.2, the volutions of which engage a respective one of teeth rows 28 or 30, so that a forward or backward movement of the carriage 16 along the guide rods 12 and 14 is accomplished with motor 24 via drive pinion 34 and, depending on the direction of rotation of the motor 24, first gears 32.1 and 32.2 and worm gears 36.1 and 36.2.

Figure 8:
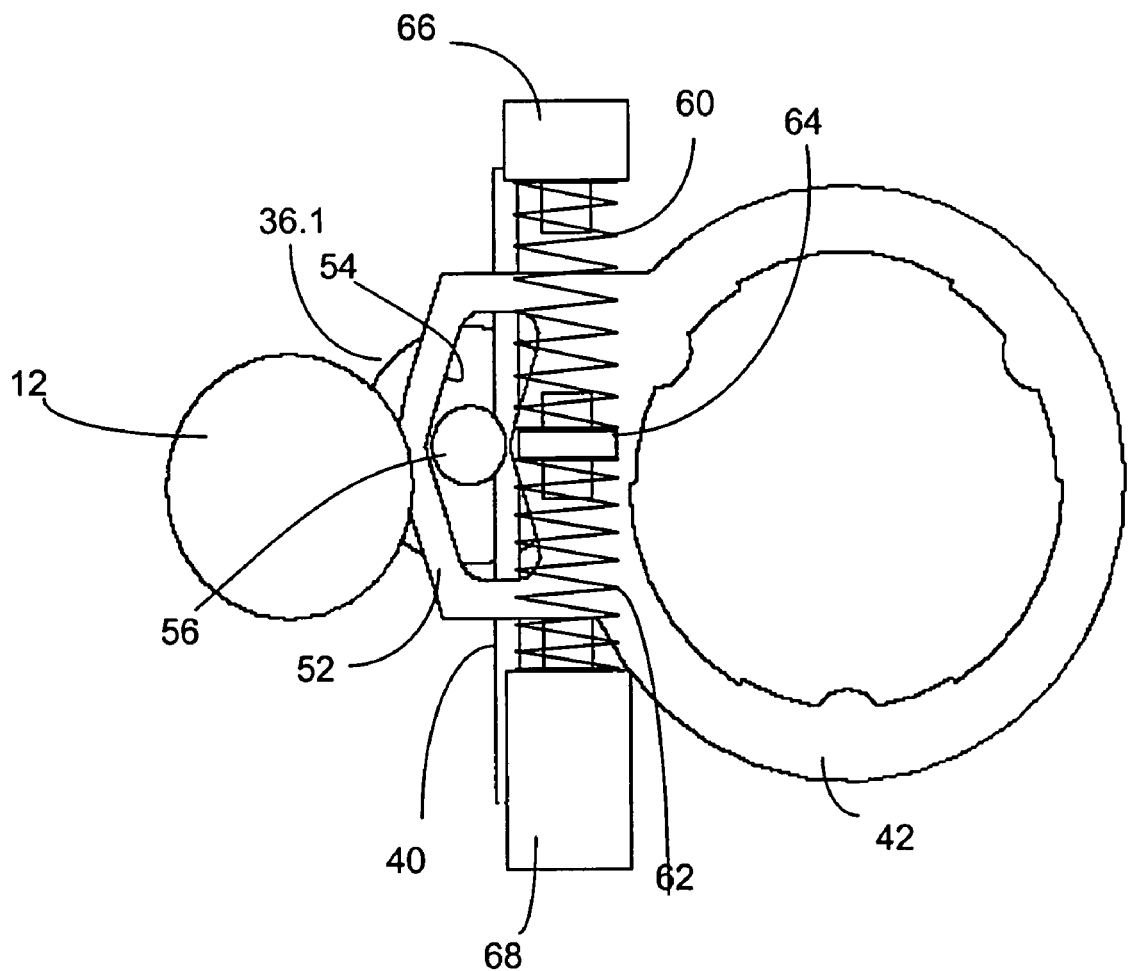
FIG. 8 is a front view like FIG. 4 and shows only the portion of the components pertaining to a securing mechanism.

The adjusting device 10 of the invention further has a securing mechanism 38 as shown in FIG. 8. The securing mechanism 38 includes a leaf spring 40, a guide lever 42, and first and second return springs 44 and 46. The leaf spring 40 serves as a tensioning or clamping element that forces the worm gear 36.1 against the row of teeth 28 of the guide rod 12. Thus, the leaf spring 40 together with the worm gear 36.1 forms a securing element which supplements and enhances the self-locking between worm gear 36.1 and row of teeth 28, which intensifies the blocking of the carriage 16 in the desired position.

Figure 4:
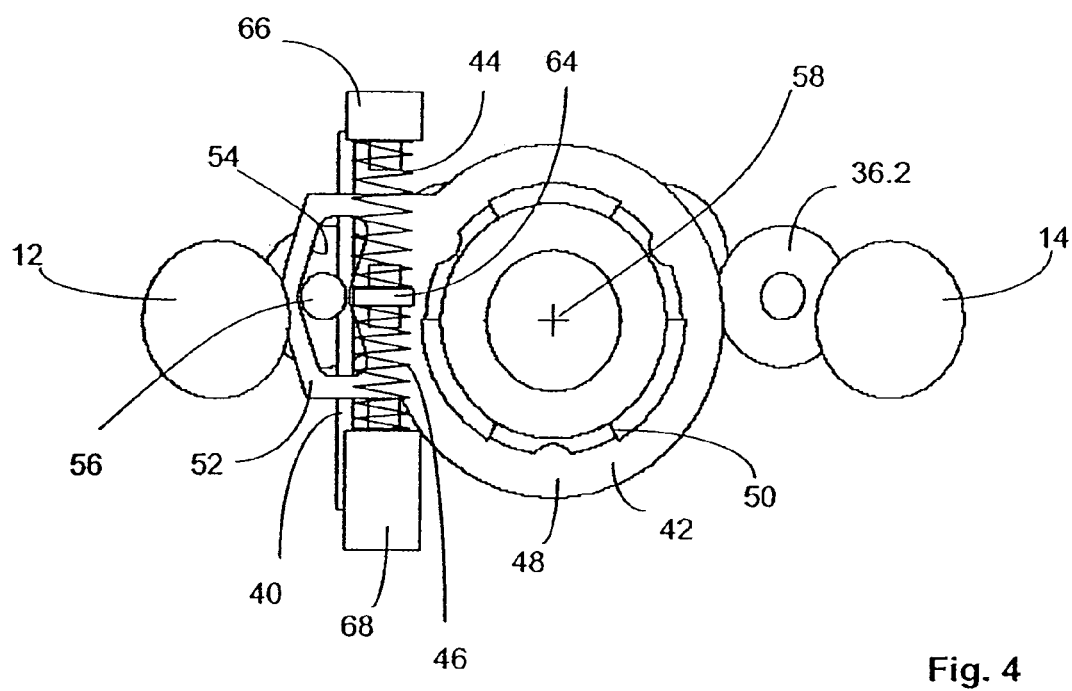
FIGS. 4 and 5 are front views of the shifting device of FIG. 3.
Figure 7:
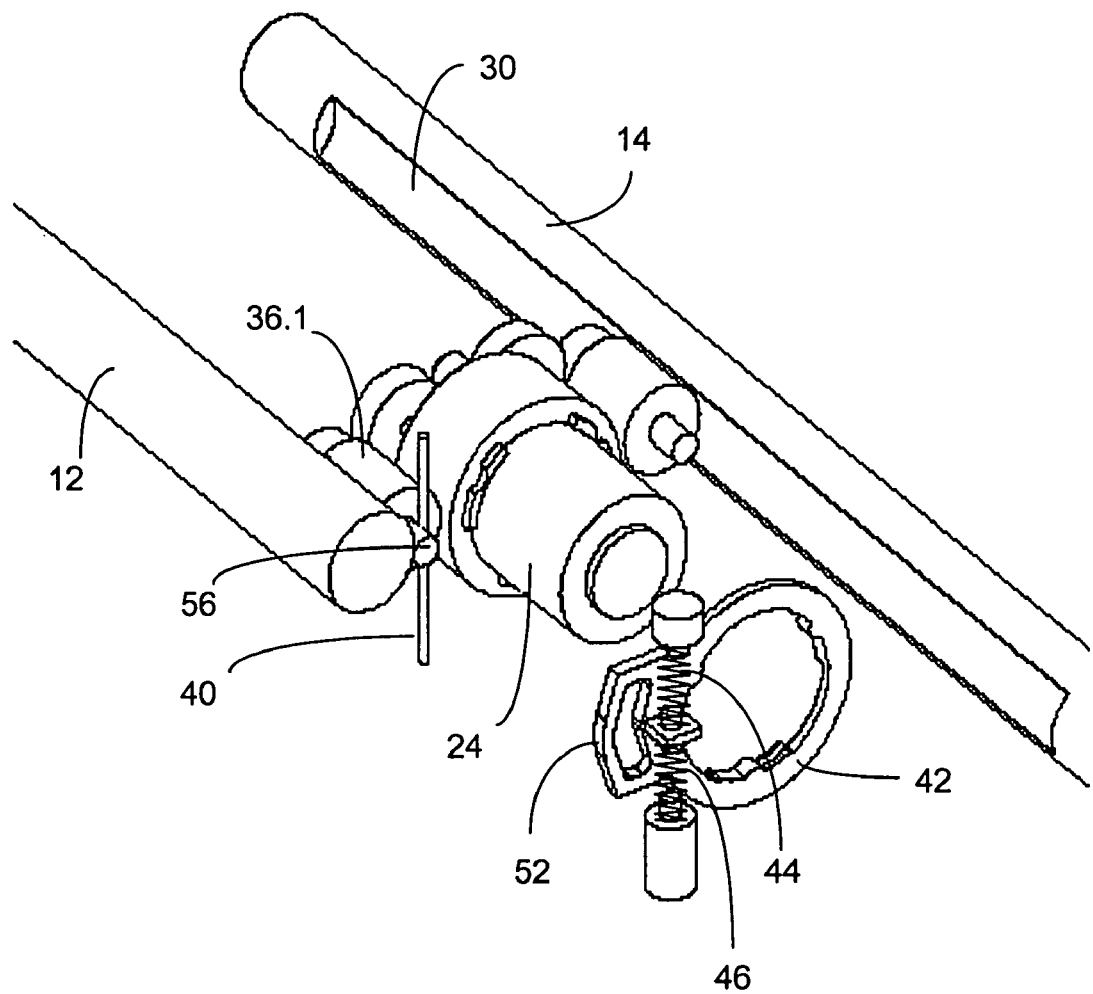
FIG. 7 is a partially exploded view of the shifting device of FIG. 3.

Blocking of the carriage occurs as long as the motor 24 is standing still. The guide lever 42 is in a central position of rest, as shown in FIGS. 4 and 8. The guide lever 42 has the shape shown in FIGS. 4 and 8 and an annular segment 48 with which the guide lever 42 is pulled onto and seated on a housing 25 of the motor 24 (FIG. 4). To join the guide lever torsion-free to the motor housing 25, the annular segment 48 and the motor housing 25 have corresponding anti-twist features 50 (FIG. 4) in the form of cooperating elevations and depressions (FIG. 7).

Adjoining the annular segment 48 is a guide section 52, which has a guide groove 54. Guide groove 54 holds a shaft 56 of worm gear 36.1. When the motor starts to run, the motor housing 25 will pivot about its axis of rotation 58 because of the torque which the motor 24 must exert in order to drive transmission 26. Motor housing 25 is mounted so that it can turn in housing 18. When the motor housing 25 pivots, guide lever 42 pivots an equal amount. Since the worm gear shaft 56 is guided in the guide groove 54 and the guide groove 54 is shaped (FIGS. 4 and 8) so that the worm gear 36.1 is moved away from the row of teeth 28 when the guide lever 42 turns about the axis of rotation 58 during start-up of motor 24, worm gear 36.1 is released from the clamping force exerted by leaf spring 40 so that carriage 16 is automatically unblocked. Of course, the worm gear 36.1 is only moved in a direction away from the row of teeth 28 so that the volutions of the gear 36.1 remain engaged with the row of teeth. The guide lever 42 and the guide groove 54 are dimensioned accordingly. The guide groove 54 is symmetrical relative to its rest position (FIGS. 4 and 8), so that the same release mechanism can be used whether the motor 24 is running clockwise or counterclockwise.

To hold the guide lever 42 in the position of rest depicted in FIGS. 4 and 8 when the motor 24 is turned off and thus clamp worm gear 36.1 with leaf spring 40 against the associated row of teeth and thereby block the carriage, first and second springs 44 and 46 are provided which together maintain guide lever 42 in a prestressed rest position. For this, the springs 44 and 46 are supported at one end by a projection 64 of guide lever 42 and at the other end by stops 66 and 68 arranged in the housing 18.

Securing mechanism 38 forms a closed regulating circuit because the motor 24 must exert a torque against the locking force while the torsion resulting from the torque is used in turn to release the blocking of the carriage. Thus, when the motor 24 is started, the carriage is automatically unblocked and remains so as long as the motor is running. When the motor stands still, the blocking is again activated by means of the spring forces.

The shifting device 22 is arranged in housing 18, is supported a housing partition wall 70, and faces in the direction of cover 20. A circuit board 72 is arranged between partition wall 70 and cover 20.

The shifting device preferably has a multi-turn rotary decoder 37, not shown or described in greater detail, which can measure, for example, the angular position and revolutions of the second worm gear 36.2. The components required for multi-turn rotary decoders, such as optical and/or magnetic sensing devices and possibly stepdown gearing, are known and are therefore not shown in the drawing. They can be arranged on circuit board 72 and/or on the partition wall 70 of the housing.

Furthermore, carriage 16 has connections 74, such as an interface, for electrical power and signal input/output.

In an alternative embodiment of the invention, a securing mechanism is provided on both sides, i.e. on both worm gears 36.1 and 36.2.

Figure 5:
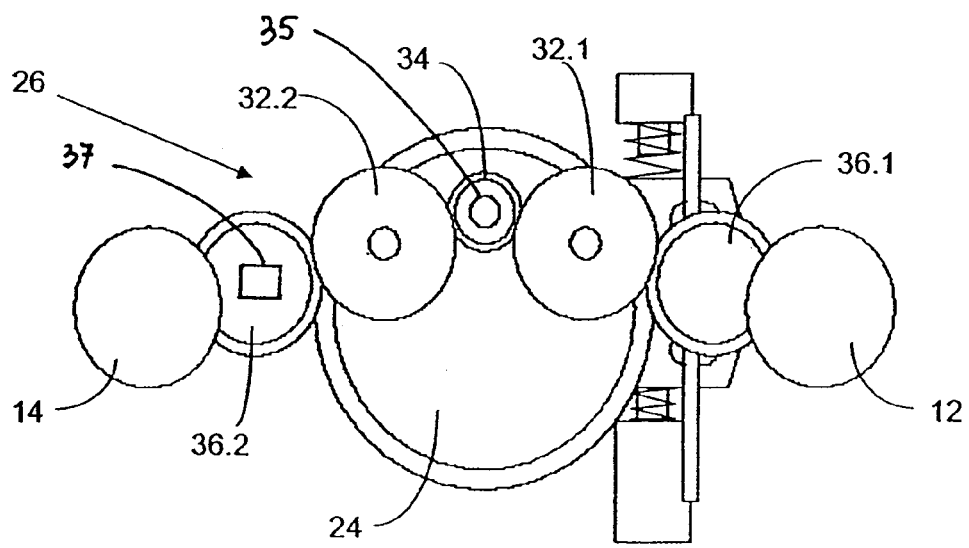
Figure 6:
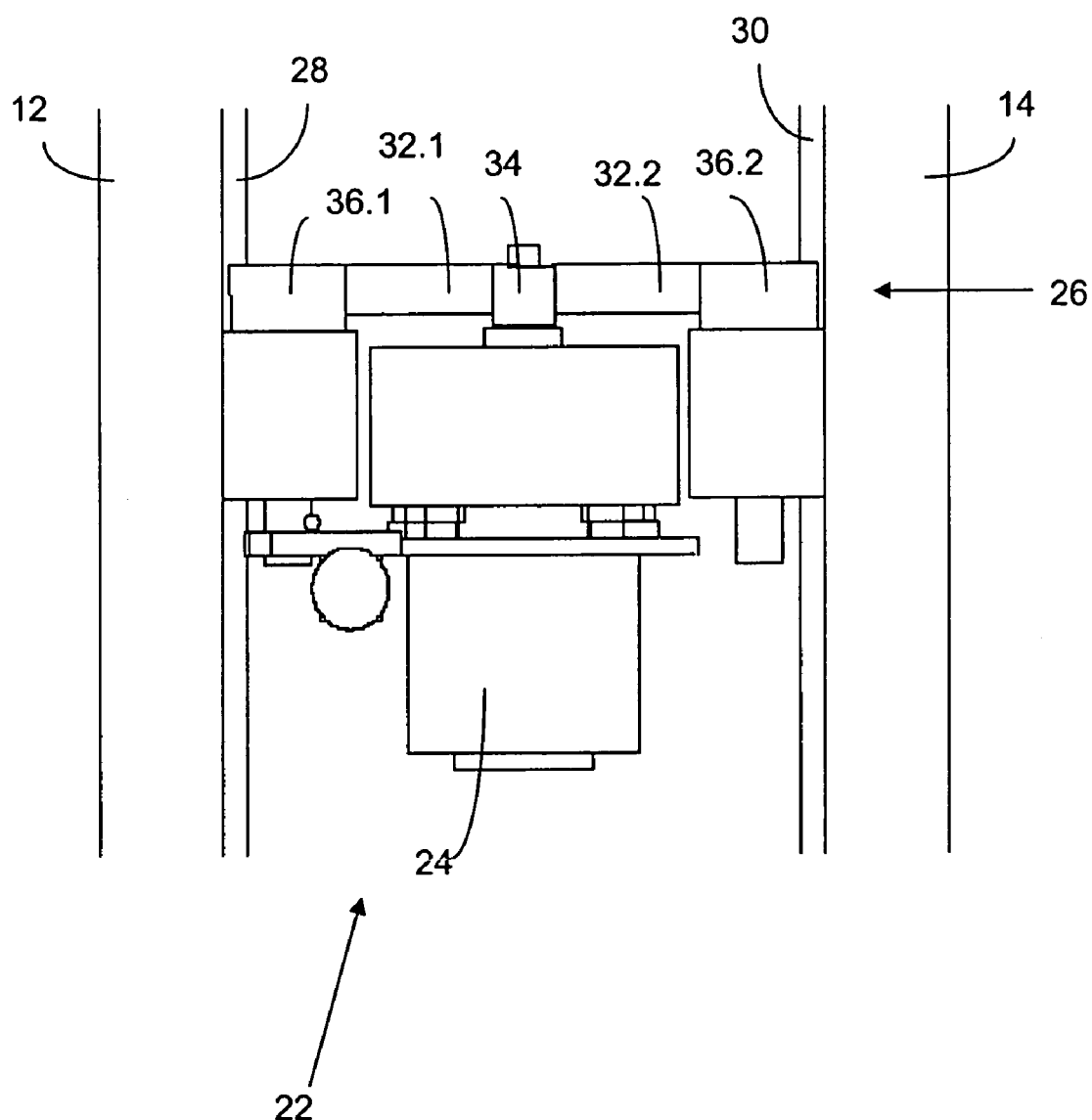
FIG. 6 is a top view of the shifting device of FIG. 3.

In a further embodiment, the adjusting device has manually activated operating elements, with which, for example, the motor can be activated and controlled. It is also useful to provide a connection for tools 35 (FIG. 5), such as a hexagonal socket wrench, with which drive pinion 34 can be manually activated, so that carriage 16 can, if necessary, be moved even when no electrical power is supplied to the adjusting device.

The invention claimed is:

1. Adjusting device comprising a carriage, at least one guide element, on which the carriage is movably mounted, a shifting device for moving the carriage, a securing mechanism for securing the carriage in a desired position, the shifting device including an electric motor which is integrated into the carriage, the securing mechanism having a securing member adapted to block movements of the carriage when the motor is standing still and to automatically release the carriage and permit it to move when the motor is activated, wherein the securing member comprises a worm gear of a drive transmission, the guide element includes a row of teeth, the worm gear engages the row of teeth, and the securing member includes a clamping element which clamps the worm gear against the row of teeth and comprises a leaf spring which acts on a shaft of the worm gear, and a release device with which the clamping force applied against the worm gear while the motor is activated is automatically released in opposition to the clamping force of the clamping element wherein the release device comprises a guide lever that is rotationally fixed relative to the motor and which guides the position of the worm gear in dependence on the angular position of a housing for the motor.

2. Adjusting device according to claim 1 wherein the guide lever has a symmetrical configuration.

3. Adjusting device according to claim 1 wherein the guide element includes first and second guide rods, wherein the motor is arranged in a mid-portion of the carriage, and including a transmission driving first and second worm gears which each engage one row of teeth of the guide rods for causing movements of the carnage.

4. Adjusting device according to claim 1 including an interface for connection to a control system for the shifting device.

5. Adjusting device according to claim 1 including manually activated operating elements for switching the motor on and off.

6. Adjusting device according to claim 1 including a connection for a tool enabling manual activation of the shifting device.

7. Adjusting device according to claim 1 wherein the shifting device includes a rotary decoder.

8. Adjusting device according to claim 7 wherein the decoder comprises a multi-turn rotary decoder.

9. Adjusting device according to claim 7 wherein the rotary decoder is adapted to determine the angular position and/or revolutions of at least one driven transmission element.

10. Adjusting device according to claim 9 wherein each worm gear includes a securing mechanism and a release device.

11. Adjusting device according to claim 9 wherein the rotary decoder includes a worm gear.

12. Adjusting device comprising a carriage, at least one guide element, on which the carriage is movably mounted, a shifting device for moving the carriage, a securing mechanism for securing the carriage in a desired position, the shifting device including an electric motor which is integrated into the carriage, the securing mechanism having a securing member adapted to block movements of the carriage when the motor is standing still and to automatically release the carriage and permit it to move when the motor is activated, wherein the securing member comprises a worm gear of a drive transmission and a clamping element which clamps the worm gear against a row of teeth engaged by the worm gear and comprises a leaf spring which acts on a shaft of the worm gear wherein a release device comprises a guide lever that is rotationally fixed relative to the motor and which guides the position of the worm gear in dependence on the angular position of a housing for the motor.

13. Adjusting device according to claim 12 wherein the guide element includes the row of teeth, and wherein the worm gear engages the row of teeth.

14. Adjusting device according to claim 12 including the release device with which the clamping force applied against the worm gear while the motor is activated is automatically released in opposition to the clamping force of the clamping element.

* * * * *